(12) United States Patent
Wang et al.

(10) Patent No.: US 11,074,081 B2
(45) Date of Patent: Jul. 27, 2021

(54) ARCHITECTURE AND METHOD SUPPORTING MULTIPLE VISION STREAM USING SHARED SERVER ON EMBEDDED PLATFORM

(71) Applicant: GM GLOBAL TECHNOLOGY OPERATIONS LLC, Detroit, MI (US)

(72) Inventors: Shige Wang, Northville, MI (US); Ming Yang, Carrboro, NC (US); Wei Tong, Troy, MI (US); Unmesh Dutta Bordoloi, Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 16/530,241

(22) Filed: Aug. 2, 2019

(65) Prior Publication Data
US 2021/0034371 A1 Feb. 4, 2021

(51) Int. Cl.
 *G06F 9/38* (2018.01)
 *G06N 3/02* (2006.01)
 *G06F 9/50* (2006.01)

(52) U.S. Cl.
 CPC .......... *G06F 9/3851* (2013.01); *G06F 9/3855* (2013.01); *G06F 9/3877* (2013.01); *G06F 9/5027* (2013.01); *G06N 3/02* (2013.01)

(58) Field of Classification Search
 CPC .... G06F 9/3851; G06F 9/3855; G06F 9/5027; G06F 9/3877; G06F 9/546; G06N 3/02
 See application file for complete search history.

(56) References Cited

U.S. PATENT DOCUMENTS

| | | | |
|---|---|---|---|
| 9,077,580 B1* | 7/2015 | Randhawa | H04L 67/1023 |
| 2002/0078072 A1* | 6/2002 | Tan | H04L 29/06 |
| 2010/0005117 A1* | 1/2010 | Stut | A61B 5/0002 707/E17.044 |
| 2011/0051605 A1* | 3/2011 | Steiner | H04M 3/42221 370/252 |
| 2012/0089369 A1* | 4/2012 | Abuzeni | H04L 67/12 702/188 |
| 2018/0157398 A1* | 6/2018 | Kaehler | G06N 3/02 |
| 2019/0324435 A1* | 10/2019 | Cella | G05B 19/41865 |
| 2020/0021775 A1* | 1/2020 | O'Connell | H04N 21/41422 |

\* cited by examiner

*Primary Examiner* — Farley Abad
(74) *Attorney, Agent, or Firm* — Lorenz & Kopf, LLP

(57) ABSTRACT

A method in a multiprocessor system for processing multiple perception streams is disclosed. The method comprises: reading data from a plurality of perception streams according to a reading schedule determined by a predetermined policy, each perception stream comprising perception data from a different perception sensor; assigning a unique identification tag to each perception stream; writing each perception stream with its unique identification tag to a server input queue based on the predetermined policy; and processing the tagged perception streams using a server. The processing includes: retrieving tagged perception streams from the server input queue; applying a processing algorithm to process the retrieved tagged perception streams; and outputting the processed perception streams to a server output queue. The method further includes retrieving the processed perception streams from the server output queue and dispatching each retrieved processed perception stream to an appropriate post-processing destination based on the tag associated with the retrieved processed perception stream.

20 Claims, 7 Drawing Sheets

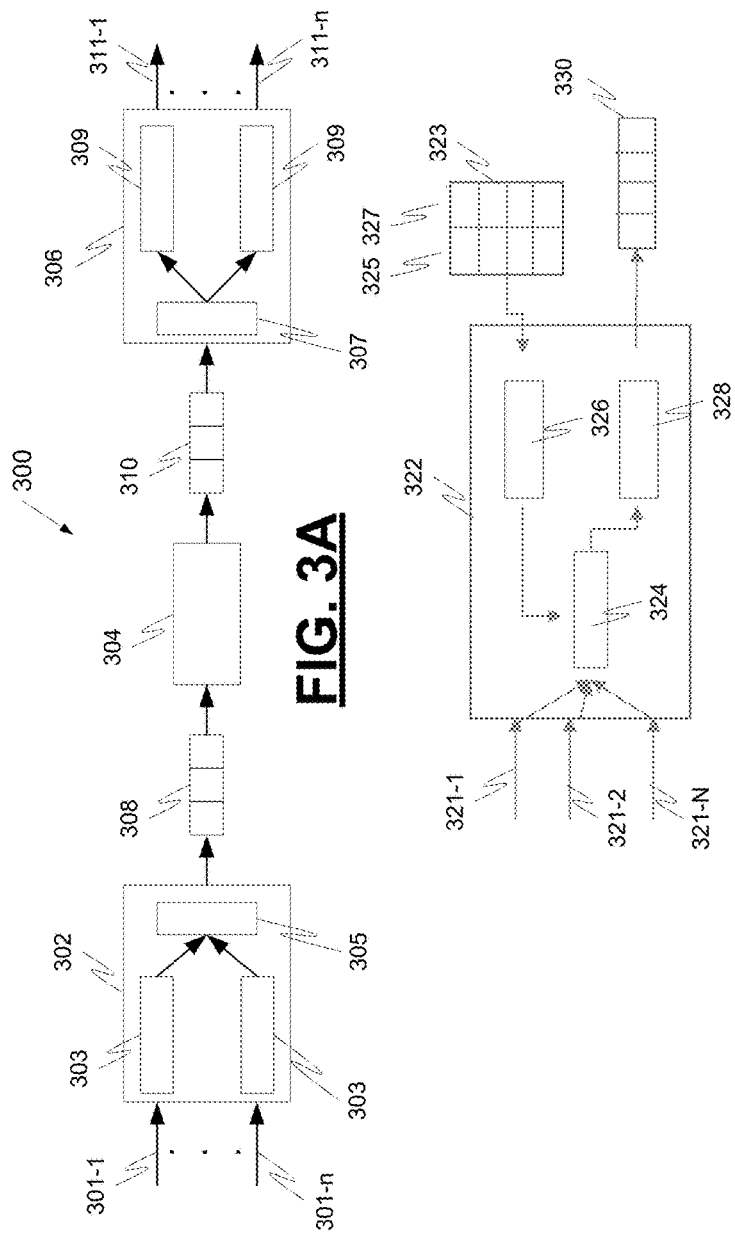
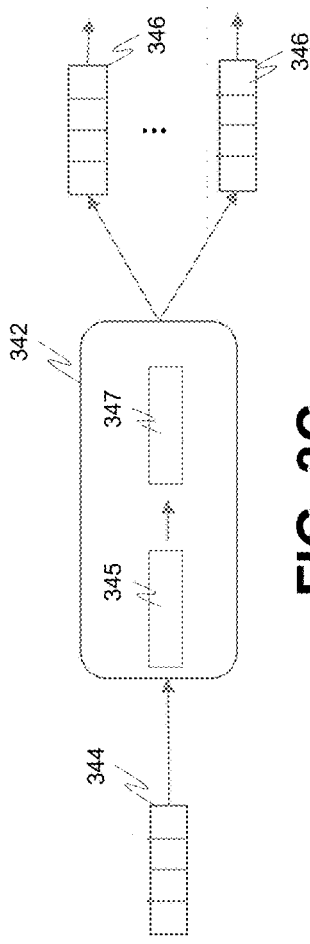
FIG. 3A
FIG. 3B
FIG. 3C

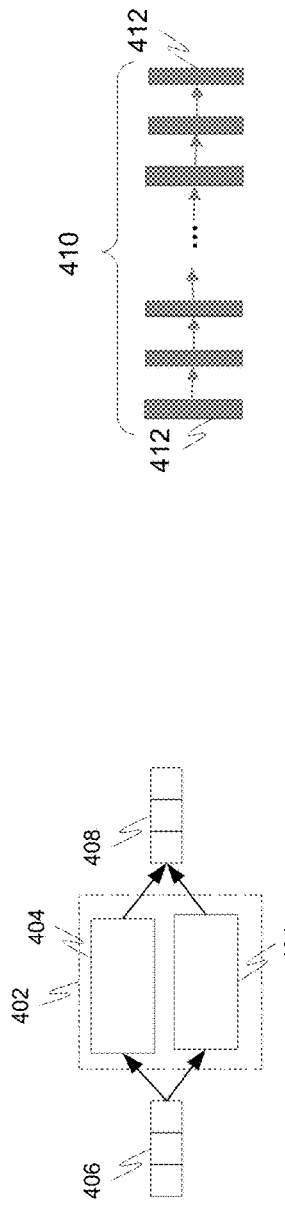
FIG. 4A
FIG. 4B
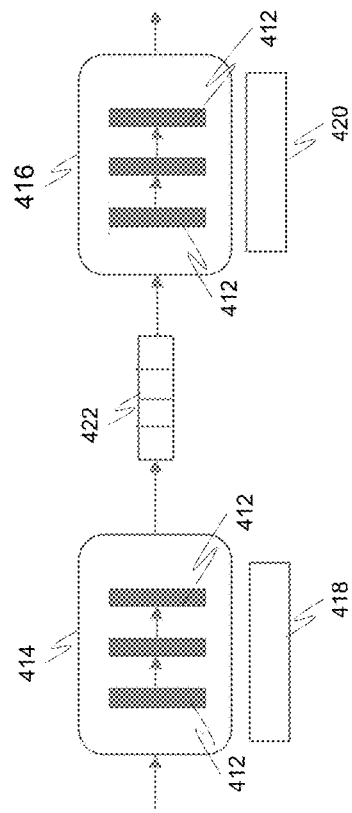
FIG. 4C
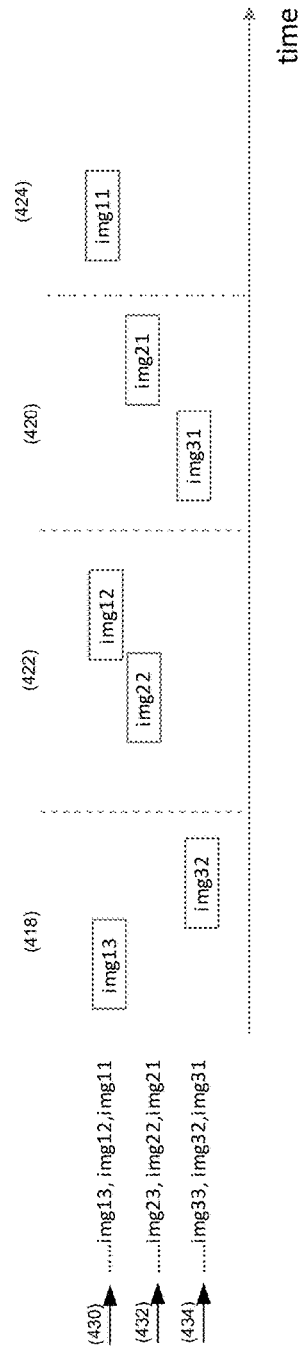
FIG. 4D

ARCHITECTURE AND METHOD SUPPORTING MULTIPLE VISION STREAM USING SHARED SERVER ON EMBEDDED PLATFORM

TECHNICAL FIELD

The technology described in this patent document relates generally to computer systems and more particularly to computer system architectures that allow processing resources to be shared.

Modern advanced vision processing algorithms such as DLNN (deep learning neural network) algorithms introduce high computation and memory workloads on controllers. This can limit the number of vision streams that can be simultaneously processed by a controller to a small number.

Advanced autonomous vehicle (AV) and advanced driver-assistance system (ADAS) applications utilize multiple perception devices, such as cameras, and consequently process data from the multiple perception devices. The processing of a perception stream from a perception device may involve computations by both a CPU (central processing unit) and an accelerator (e.g., GPUs, DSPs, FPGAs). When multiple perception streams require computations, the processing of the multiple perception streams may involve computations by multiple CPUs and accelerators that are often shared by the multiple perception streams. The computation on these devices, the CPUs and accelerators, may not be well synchronized for the multiple perception streams, resulting in lost processing capacity and higher costs.

Accordingly, it is desirable to provide a system and method for improving the synchronization of computations on the multiple CPUs and accelerators. Furthermore, other desirable features and characteristics of the present invention will become apparent from the subsequent detailed description of the invention and the appended claims, taken in conjunction with the accompanying drawings and the background of the invention.

SUMMARY

Systems and methods for improving the synchronization of computations on the multiple CPUs and accelerators are provided. In one embodiment, a controller on a device having multiple co-processors used for processing multiple perception streams is disclosed. The controller is configured to: read data from a plurality of perception streams according to a reading schedule determined by a predetermined policy, wherein each perception stream includes perception data from a different perception sensor; assign a unique identification tag to each perception stream; write each perception stream with its unique identification tag to a server input queue based on the predetermined policy for processing by a server; retrieve processed perception streams from the server output queue, wherein the processed perception streams were processed by the server and written by the server to the server output queue; and dispatch each retrieved processed perception stream to an appropriate post-processing destination, wherein the appropriate post-processing destination is determined from the tag associated with the retrieved processed perception stream.

In one embodiment, the predetermined policy identifies an order for the perception streams in the input server queue.

In one embodiment, the identified order using the predetermined policy includes the order in which the perception streams are read.

In one embodiment, the server is configured to: retrieve tagged perception streams from the server input queue in the order in which the tagged perception streams are written in the server input queue; apply a processing algorithm to process the retrieved tagged perception streams; and output the processed perception streams to the server output queue.

In one embodiment, the server includes a plurality of redundant servers wherein each redundant server is configured to operate in parallel with another redundant server.

In one embodiment, the server is implemented by accelerator hardware, the accelerator hardware including a digital signal processor (DSP) or a field programmable gate array (FPGA).

In one embodiment, the server is implemented as a software component running on accelerator hardware that includes a graphics processing unit (GPU), a central processing unit (CPU) that is dedicated or shared with other software components, or a math co-processor.

In one embodiment, the processing algorithm includes a neural network (NN) algorithm.

In one embodiment, the server includes a plurality of hardware devices and the processing algorithm is partitioned into a plurality of processing algorithm partitions.

In one embodiment, the controller further includes a communication buffer for holding data between execution of an upstream processing algorithm partition and execution of a downstream processing algorithm partition.

In one embodiment, the downstream processing algorithm partition may be invoked asynchronously to process data stored in the communication buffer when data is available in the communication buffer.

In another embodiment, a method in a multiprocessor system for processing multiple perception streams using a plurality of processing devices is provided. The plurality of processing devices includes a central processing unit (CPU) and an accelerator device. The method includes: reading data from a plurality of perception streams according to a reading schedule determined by a predetermined policy, wherein each perception stream includes perception data from a different perception sensor; assigning a unique identification tag to each perception stream; writing each perception stream with its unique identification tag to a server input queue based on the predetermined policy; and processing the tagged perception streams using a server. The processing includes: retrieving tagged perception streams from the server input queue in the order in which the tagged perception streams are written in the server input queue; applying a processing algorithm to process the retrieved tagged perception streams; and outputting the processed perception streams to a server output queue. The method further includes retrieving the processed perception streams from the server output queue; and dispatching each retrieved processed perception stream to an appropriate post-processing destination, wherein the appropriate post-processing destination is determined from the tag associated with the retrieved processed perception stream.

In one embodiment, the frequency at which a first perception stream is read is different from the frequency at which a second perception stream is read.

In one embodiment, applying a processing algorithm includes applying a neural network (NN) algorithm.

In one embodiment, the server includes a plurality of hardware devices and the processing algorithm is partitioned into a plurality of processing algorithm partitions.

In one embodiment, the method further includes executing each processing algorithm partition by a different one of the plurality of hardware devices.

In one embodiment, the method, further includes providing a communication buffer for holding data between execution of an upstream processing algorithm partition and execution of a downstream processing algorithm partition.

In one embodiment, the method further includes invoking the downstream processing algorithm partition asynchronously to process data stored in the communication buffer when data is available in the communication buffer.

In one embodiment, the method further includes storing results from the execution of the upstream processing algorithm partition in the communication buffer and retrieving the results from the communication buffer for execution by the downstream processing algorithm partition.

In another embodiment, a vehicle for transporting passengers, the vehicle comprising a plurality of perception data sources for performing detection and viewing operations for the vehicle and a perception data processing system configured for processing perception data from multiple perception data sources is provided. The perception data processing system includes a plurality of processing units including one or more central processing units (CPUs) and one or more accelerator modules; memory media having a plurality of memory segments for implementing a server input queue and a server output queue; and a scanner implemented by one or more of the plurality of processing units. The scanner is configured to: read data from a plurality of perception streams according to a reading schedule determined by a predetermined policy, wherein each perception stream includes perception data from a different perception sensor; assign a unique identification tag to each perception stream; and write each perception stream with its unique identification tag to the server input queue based on the predetermined policy. The perception data processing system further includes a server implemented by one or more of the plurality of processing units. The server is configured to: retrieve tagged perception streams from the server input queue in the order in which the tagged perception streams are written in the server input queue; apply a processing algorithm to process the retrieved tagged perception streams; and output the processed perception streams to the server output queue. The perception data processing system further includes a dispatcher implemented by one or more of the plurality of processing units. The dispatcher is configured to: retrieve the processed perception streams from the server output queue; and dispatch each retrieved processed perception stream to an appropriate post-processing destination, wherein the appropriate post-processing destination is determined from the tag associated with the retrieved processed perception stream.

BRIEF DESCRIPTION OF THE DRAWINGS

The exemplary embodiments will hereinafter be described in conjunction with the following drawing figures, wherein like numerals denote like elements, and wherein:

FIG. 3A is a block diagram depicting an example system for processing perception data from multiple perception data sources, in accordance with various embodiments;

FIG. 3B is a block diagram depicting an example scanner, in accordance with various embodiments;

FIG. 3C is a block diagram depicting an example dispatcher, a server output buffer, and a plurality of stream output buffers, in accordance with various embodiments;

FIG. 4A is a block diagram illustrating that an example server may be made up of a plurality of redundant servers wherein each redundant server is configured to operate in parallel with another redundant server, in accordance with various embodiments;

FIG. 4B is a diagram that illustrates that an example server algorithm may have a plurality of layers such as that found in a neural network, in accordance with various embodiments;

FIG. 4C is a diagram that illustrates that the example server algorithm layers may be partitioned into a plurality of partitions and that each partition may be assigned to a different hardware device for execution, in accordance with various embodiments;

FIG. 4D is a diagram illustrating how multiple vision streams may be processed in parallel using the algorithm partition scheme illustrated in FIG. 4C, in accordance with various embodiments;

DETAILED DESCRIPTION

Figure 1:
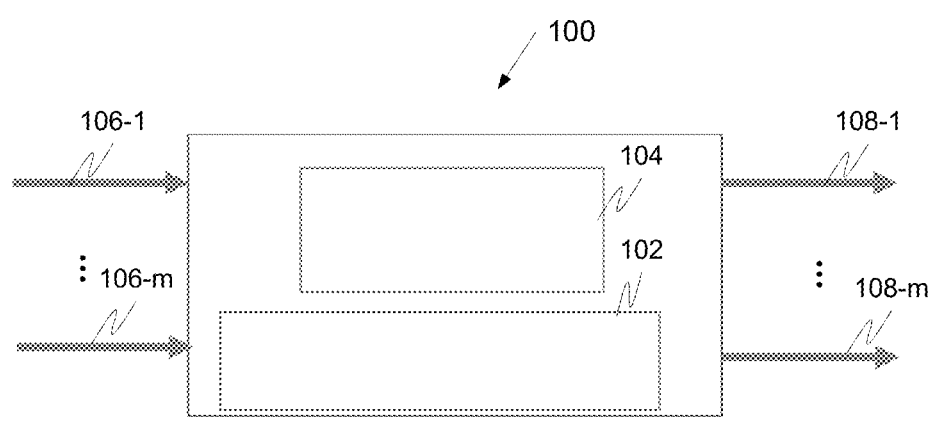
FIG. 1 is a block diagram depicting an example controller for processing perception data from multiple perception data sources, in accordance with various embodiments.

The following detailed description is merely exemplary in nature and is not intended to limit the application and uses. Furthermore, there is no intention to be bound by any expressed or implied theory presented in the preceding technical field, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Modern advanced vision processing algorithms, such as deep learning neural networks (DLNN) introduce high computation and memory workloads on controllers. This can limit the vision streams that can be simultaneously processed by a controller to a small number.

The subject matter described herein discloses apparatus, systems, techniques and articles that describe an architecture of a device with shared co-processors for processing multiple perception (e.g., vision) streams. The described apparatus, systems, techniques and articles adopt a server concept to allow a single version of an algorithm to be applied to multiple perception streams, instead of a dedicated version of an algorithm applied to each stream, resulting in more streams being supported without additional hardware. The described apparatus, systems, techniques and articles may implement the processing algorithm as a server that processes multiple streams in time multiplex, reducing parameter memory. The described apparatus, systems, techniques and articles may implement front-end processing that may run as a client on a CPU to process each input with tags and communicate with processing server. The described apparatus, systems, techniques and articles may provide an architecture with communication and synchronization to enable partitioning of the server computing across multiple devices. The described apparatus, systems, techniques and articles may provide the capability for pipelining.

FIG. 1 is a block diagram depicting an example controller 100 for processing perception data from multiple perception data sources. The example controller 100 includes hardware 102 and software 104. The example hardware 102 includes one or more central processing units (CPUs) and accelerators, communication hardware, and memory. Examples of an accelerator may include a graphics processing unit (GPU), digital signal processor (DSP), field programmable gate array (FPGA), a math co-processor, and others. The software 104 when executed via the hardware 102 is configured to provide a server that runs an algorithm for processing multiple streams of perception data. Through the use of the server, the example controller 100 is configured to process multiple input perception streams 106-1 to 106-*m* of perception data using shared hardware resources to generate multiple output streams 108-1 to 108-*m*. This architecture can allow a single version of an algorithm to be applied to multiple perception streams, instead of a dedicated version of an algorithm applied to each stream, resulting in more streams being supported without additional hardware.

Figure 2A:
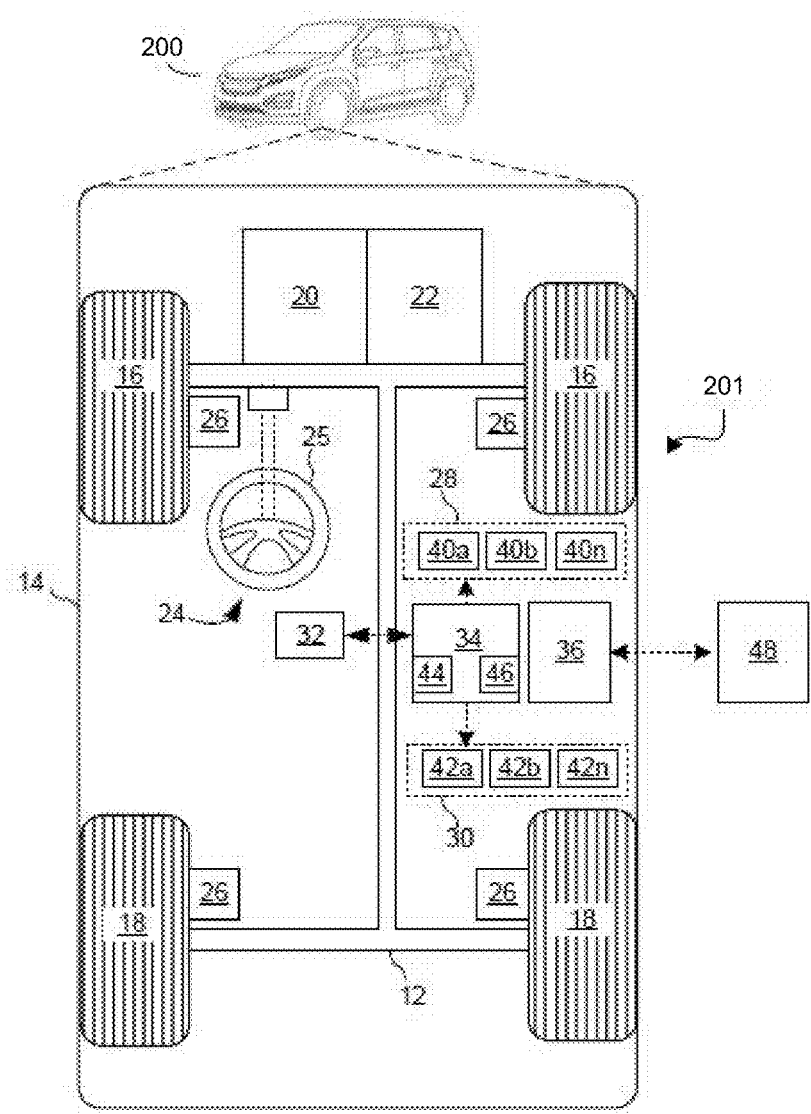
FIG. 2A depicts an example vehicle that includes a controller for processing multiple perception (e.g., vision) streams, in accordance with various embodiments.

FIG. 2A depicts an example vehicle 200 that includes a controller 210 for processing multiple perception (e.g., vision) streams. As depicted in FIG. 2A, the vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including motorcycles, trucks, sport utility vehicles (SUVs), recreational vehicles (RVs), marine vessels, aircraft, etc., may also be used. The vehicle 200 further includes a propulsion system 20, a transmission system 22, a steering system 24, a brake system 26, a sensor system 28, an actuator system 30, at least one data storage device 32, at least one controller 34, and a communication system 36 that is configured to wirelessly communicate information to and from other entities 48.

The data storage device 32 stores data for use in automatically controlling the vehicle 200. The data storage device 32 may be part of the controller 34, separate from the controller 34, or part of the controller 34 and part of a separate system. The controller 34 includes at least one processor 44 and a computer-readable storage device or media 46. In various embodiments, controller 34 is configured to implement a controller 210 for processing multiple perception streams. Although only one controller 34 is shown in FIG. 2A, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200.

Figure 2B:
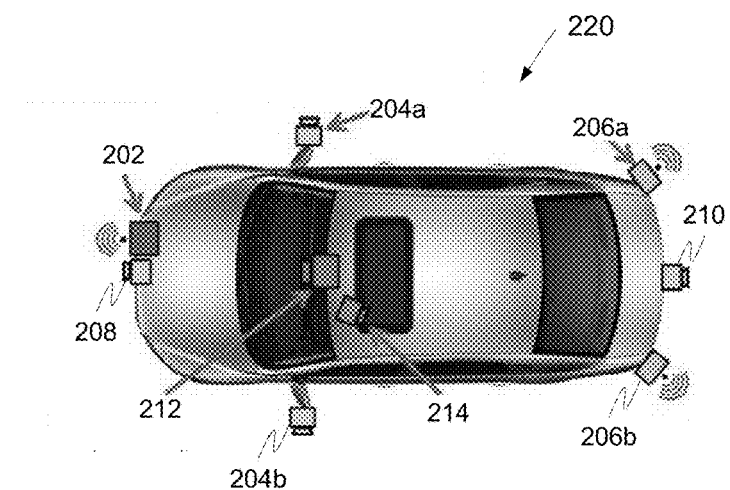
FIG. 2B depicts an example vehicle having a plurality of perception sources for performing detection and viewing operations for the vehicle, in accordance with various embodiments.

FIG. 2B depicts an example vehicle 220 having a plurality of perception sources for performing detection and viewing operations for the vehicle. The detection operations may provide object detection, pedestrian detection, sign detection, traffic detection, lane detection, free space detection, occupant/seat belt/child seat detection, and others. The viewing operations may provide a surround view, rear view, blind spot view, in-cabin view, and others. The perception sources, in this example, include a front radar 202 for adaptive cruise control and distance warning, surround view cameras 204*a*/204*b* for displaying in an infotainment system a view on either side of the vehicle, blind spot detection radars 206*a*/206*b*, a front view camera 208, a rear view camera 210, a front camera 212 with visual or haptic warning, and a driver monitoring camera 214 with haptic or acoustic warning. The multiple perception sources generate multiple streams of perception data. The multiple streams of perception data may be processed by a common set of resources.

FIG. 3A is a block diagram depicting an example system 300 for processing perception data from multiple perception data sources. The example system 300 comprises a scanner 302, a server 304, a dispatcher 306, a server input queue 308, and a server output queue 310. The hardware associated with the example system 300 includes a plurality of processing units comprising one or more central processing units (CPUs) and one or more accelerator modules for implementing the scanner 302, server 304, and dispatcher 306; and memory media having a plurality of memory segments for implementing the server input queue 308 and the server output queue 310.

The example scanner 302 is implemented by one or more of the plurality of processing units configured by programming instructions on non-transient computer readable media. The example scanner 302 is configured to read data from a plurality of perception streams 301-1 to 301-*n* according to a reading schedule determined by a predetermined policy. Each perception stream includes perception data from a different perception sensor. The perception sensors may include one or more of a camera, lidar, or other perception sensor data source. The example scanner 302 is further configured to assign a unique identification tag to each perception stream (e.g., in pre-processing operation 303) and write each perception stream with its unique identification tag to the server input queue 308 based on the predetermined policy (e.g., in scanning operation 305).

The example server 304 is implemented by one or more of the plurality of processing units. The server may be implemented by accelerator hardware such as a digital signal processor (DSP) or a field programmable gate array (FPGA). The server may be implemented as a software component running on accelerator hardware such as a graphics processing unit (GPU), a central processing unit (CPU) that is dedicated or shared with other software components, or a math co-processor.

The example server 304 is configured to retrieve tagged perception streams from the server input queue 308, for example, in the order in which the tagged perception streams are written in the server input queue 308; apply a processing algorithm to process the retrieved tagged perception streams; and output the processed perception streams to the server output queue 310. The processing algorithm may include a neural network (NN), which are often used for processing perception data.

The example dispatcher 306 is implemented by one or more of the plurality of processing units configured by programming instructions on non-transient computer readable media. The example dispatcher 306 is configured to retrieve the processed perception streams from the server output queue 310 and dispatch each retrieved processed perception stream to an appropriate post-processing destination (e.g., via dispatch operation 307). The appropriate post-processing destination is determined from the tag associated with the retrieved processed perception stream. To dispatch each retrieved processed perception stream to an appropriate post-processing destination, the example dispatcher 306 may be configured to decode each retrieved processed perception stream to separate the results of different streams using the tag information. To dispatch, the example dispatcher 306 may also remove the tag associated with the processed perception stream (e.g., via post-process operation 309) and transmit each retrieved processed perception stream minus the tag as processed output 311 (e.g., stream output 311-1 to 311-n).

FIG. 3B is a block diagram depicting an example scanner 322 (e.g., scanner 302). The example scanner 322 includes a reader module 324, a scheduler module 326, and a tagger module 328. The reader module 324 is configured to read in input streams 321-1, 321-2, . . . , 321-N in accordance with a predetermined policy implemented by the scheduler module 326. The predetermined policy may identify an order and schedule for the perception streams in the input server queue. The identified order may include the order in which the perception streams are read.

The scheduler module 326 may be configured to determine the reading order according to the predetermined policy and schedule based on a table 323 that identifies in each table row a stream identifier 325 and a predetermined reading frequency 327. The frequency at which one perception stream (e.g., 321-1) is read may be different from the frequency at which another perception stream (e.g., 321-2) is read.

The tagger module 328 is configured to tag the data read from each input stream using a tag identifier specific to the input stream so that the perception stream data can be reconstructed after processing by a server (e.g., server 304). The tagger module 328 is configured to store the tagged input stream data with its associated tag identifier in a queue 3300 (e.g., the server input queue 308).

FIG. 3C is a block diagram depicting an example dispatcher 342 (e.g., dispatcher 306), a server output buffer 344 (e.g., server output queue 310), and a plurality of stream output buffers 346. The example dispatcher 342 is implemented by one or more of the plurality of processing units configured by programming instructions on non-transient computer readable media. The example dispatcher 342 is configured to retrieve the processed perception streams from the server output buffer 344, decode (345) each retrieved processed perception stream to separate the results of different streams using the tag information, and dispatch (347) each retrieved processed perception stream to an appropriate post-processing destination. The appropriate post-processing destination is determined from the tag associated with the retrieved processed perception stream. The plurality of stream output buffers 346 may be implemented by the memory media, and the dispatcher 342 is configured to dispatch each retrieved processed perception stream to an appropriate one of the plurality of stream output buffers 346 for downstream processing.

FIG. 4A is a block diagram illustrating that an example server 402 may be made up of a plurality of redundant servers 404 wherein each redundant server 404 is configured to operate in parallel with another redundant server. In this example, each redundant server 404 may retrieve tagged input stream data from a common server input queue 406, process the retrieved tagged input stream data, and output the processed tagged stream data to a common server output queue 408.

FIG. 4B is a diagram that illustrates that an example server algorithm 410 may have a plurality of layers 412 such as that found in a neural network. Each layer 412 in the server algorithm 410 may represent one or more layers of a neural network.

FIG. 4C is a diagram that illustrates that the example server algorithm layers 412 may be partitioned into a plurality of partitions 414, 416 and that each partition 414, 416 may be assigned to a different hardware device 418, 420 for execution. The server that executes the partitions 414, 416 may include a plurality of hardware devices (e.g., CPUs and/or accelerators) and the processing algorithm is partitioned into a plurality of processing algorithm partitions 414, 416. The number of processing algorithm partitions may be equal to the number of hardware devices assigned to execute the algorithm and each processing algorithm partition may be executed by a different one of the plurality of hardware devices. The server that executes the partitions 414, 416 may also include a communication buffer 422, implemented by memory, for holding data between execution of an upstream processing algorithm partition 414 and execution of a downstream processing algorithm partition 416. The downstream processing algorithm partition 416 may be invoked asynchronously to process data stored in the communication buffer 422 when data is available in the communication buffer 422. Consequently, results from the execution of the upstream processing algorithm partition 414 may be stored in the communication buffer 422 and the results may be retrieved from the communication buffer 422 for execution by the downstream processing algorithm partition 416.

FIG. 4D is a diagram illustrating how multiple vision streams may be processed in parallel using the algorithm partition scheme illustrated in FIG. 4C. A first perception stream 430 may include data for image 13, image 12, and image 11. A second perception stream 432 may include data for image 23, image 22, and image 21. A third perceptions stream 434 may include data for image 33, image 32, and image 31. In this example, image 13 and image 32 could be processed on device1 (418). Image 12 and image 22 may be in the communication buffer 422. Image 21 and image 31 may be processed on device2 (420). Image 11 may have already been outputted as an output result (424). Image 23 and image 33 may be waiting to be processed on device1 (418).

Figure 5:
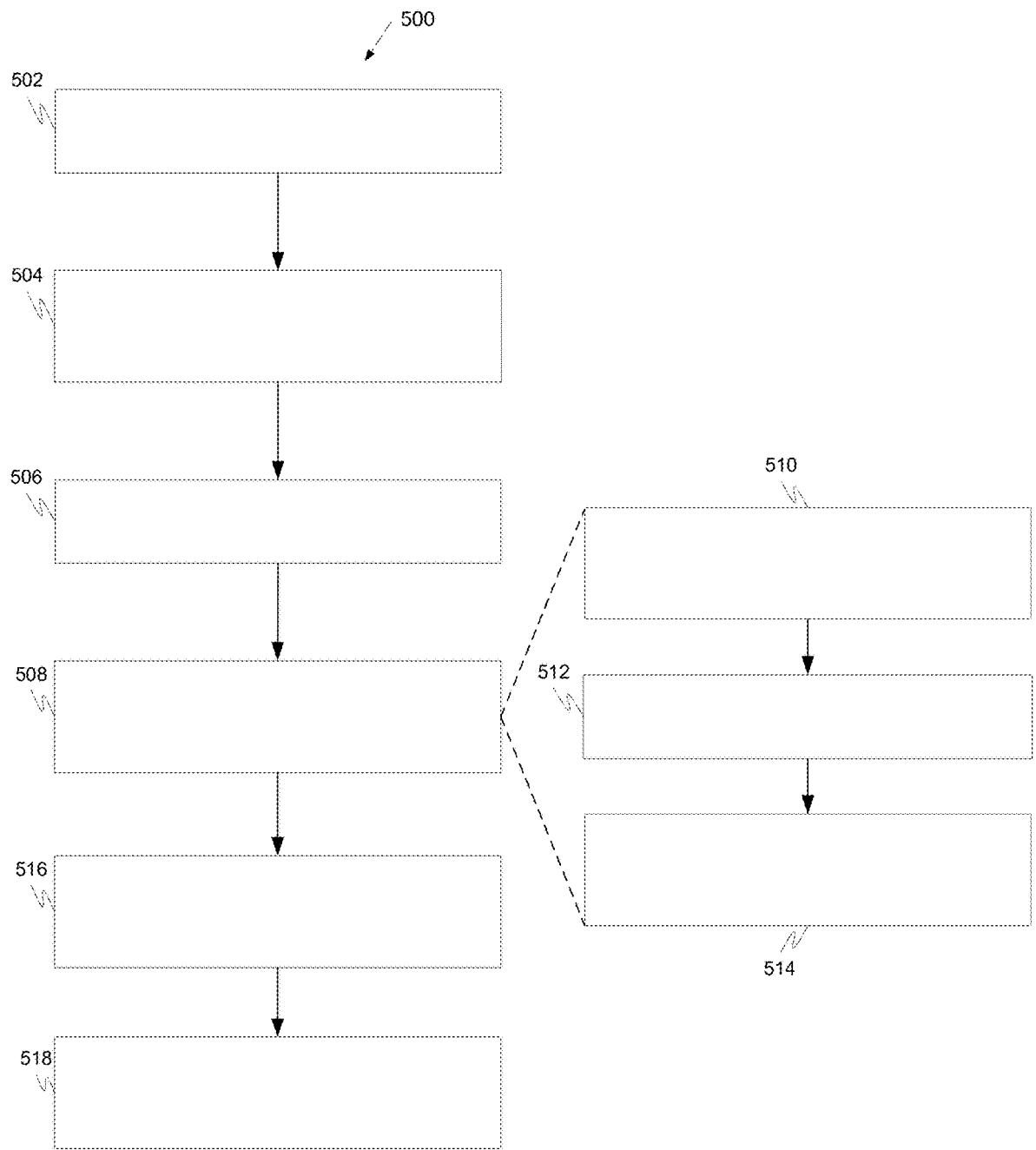
FIG. 5 is a process flow chart depicting an example process in a multiprocessor system for processing multiple perception streams using a plurality of processing devices, in accordance with various embodiments.

FIG. 5 is a process flow chart depicting an example process 500 in a multiprocessor system for processing multiple perception streams using a plurality of processing devices. The plurality of processing devices includes a central processing unit (CPU) and an accelerator device. The order of operation within process 500 is not limited to the sequential execution as illustrated in FIG. 5, but may be performed in one or more varying orders as applicable and in accordance with the present disclosure.

The example process 500 includes reading data from a plurality of perception streams according to a reading schedule determined by a predetermined policy (operation 502). Each perception stream includes perception data from a different perception sensor. The perception sensors may include one or more of a camera, lidar, or other perception sensor data source. The frequency at which a first perception stream is read may be different from the frequency at which a second perception stream is read.

The example process 500 includes assigning a unique identification tag to each perception stream (operation 504) and writing each perception stream with its unique identification tag to a server input queue based on a predetermined policy (operation 506). The server input queue may comprise storage media accessible by the controller such as memory. The predetermined policy may identify an order for the perception streams in the input server queue. The identified order may include the order in which the perception streams are read.

The example process 500 includes processing the tagged perception streams using a server (operation 508). The server may comprise a plurality of redundant servers wherein each redundant server is configured to operate in parallel with another redundant server. The server may be implemented by accelerator hardware, wherein the accelerator hardware may include a digital signal processor (DSP) or a field programmable gate array (FPGA). The server may be implemented as a software component running on accelerator hardware such as a graphics processing unit (GPU), a central processing unit (CPU) that is dedicated or shared with other software components, or a math co-processor.

The processing may include: retrieving tagged perception streams from the server input queue in the order in which the tagged perception streams are written in the server input queue (operation 510), applying a processing algorithm to process the retrieved tagged perception streams (operation 512), and outputting the processed perception streams to a server output queue (operation 514).

Applying a processing algorithm may include applying a neural network (NN) algorithm. The server may include a plurality of hardware devices and the processing algorithm may be partitioned into a plurality of processing algorithm partitions. The number of processing algorithm partitions may be equal to the number of hardware devices. The process may further include executing each processing algorithm partition by a different one of the plurality of hardware devices. The process may further include providing a communication buffer for holding data between execution of an upstream processing algorithm partition and execution of a downstream processing algorithm partition. The process may further include invoking the downstream processing algorithm partition asynchronously to process data stored in the communication buffer when data is available in the communication buffer. The process may further include storing results from the execution of the upstream processing algorithm partition in the communication buffer and retrieving the results from the communication buffer for execution by the downstream processing algorithm partition.

The example process 500 includes retrieving the processed perception streams from the server output queue (operation 516) and dispatching each retrieved processed perception stream to an appropriate post-processing destination (operation 518). The appropriate post-processing destination may be determined from the tag associated with the retrieved processed perception stream. The dispatching each retrieved processed perception stream to an appropriate post-processing destination may include decoding each retrieved processed perception stream to identify associated tag information and separating the results of different streams using the tag information. A plurality of stream output buffers may be provided and the dispatching each retrieved processed perception stream to an appropriate post-processing destination may include dispatching each retrieved processed perception stream to an appropriate one of the plurality of stream output buffers for downstream processing.

Figure 6:
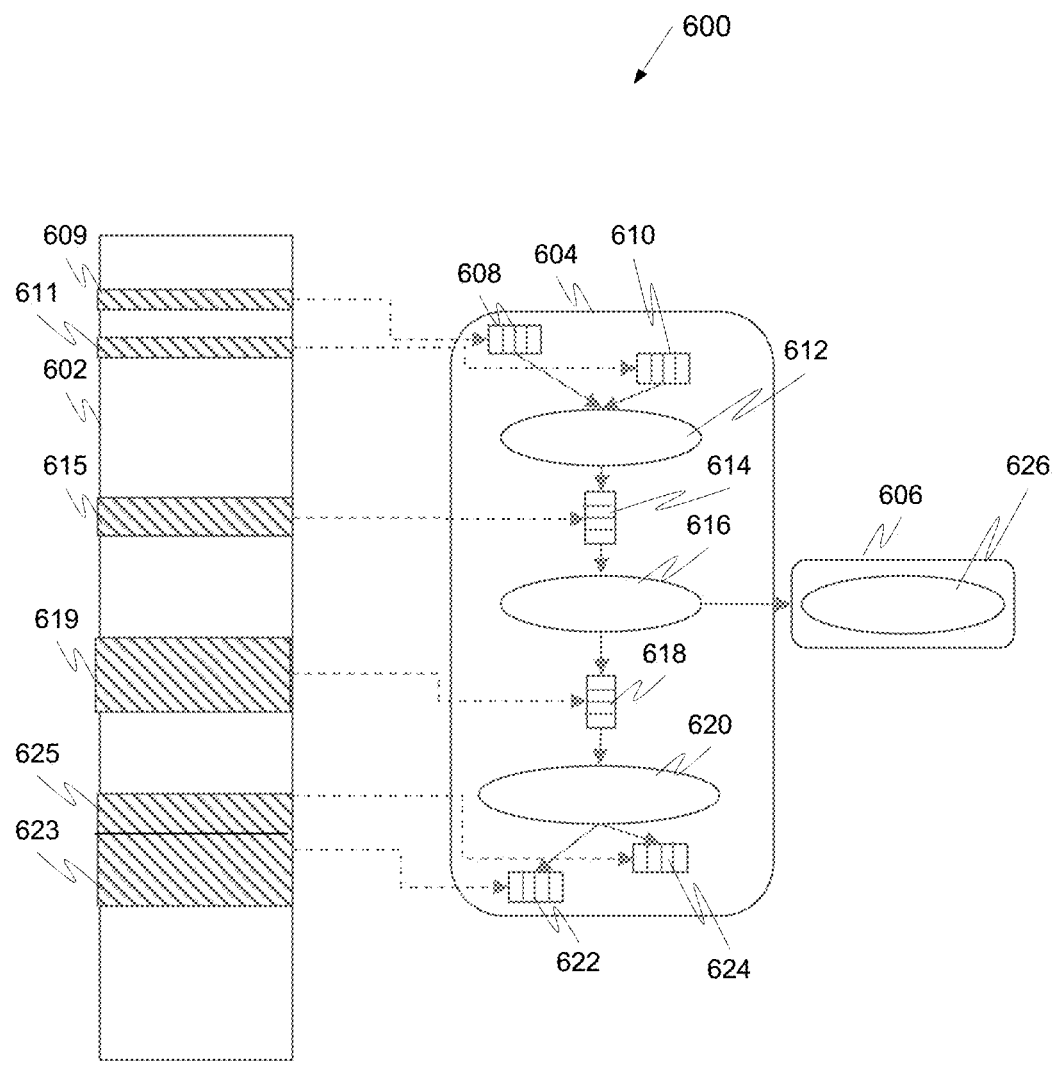
FIG. 6 is a block diagram illustrating an example hardware configuration for a controller for processing perception data from multiple perception data sources, in accordance with various embodiments.

FIG. 6 is a block diagram illustrating an example hardware configuration for a controller 600 for processing perception data from multiple perception data sources. The example hardware used in the controller 600 includes system memory 602, a CPU 604, and an accelerator 606. The example hardware is used to implement a first input buffer 608 for retrieving perception stream data from a first perception data stream, a second input buffer 610 for retrieving perception stream data from a second perception data stream, a scanner 612, a server input queue 614, a server 616, a server output queue 618, a dispatcher 620, a first stream output buffer 622 for outputting processed stream data for the first perception stream, a second stream output buffer 624 for outputting processed stream data for the second perception stream, and an algorithm 626.

The first input buffer 608 may be implemented by a first memory segment 609 in system memory 602, the second input buffer 610 may be implemented by a second memory segment 611 in system memory 602, the server input queue 614 may be implemented by a third memory segment 615 in system memory 602, the server output queue 618 may be implemented by a fourth memory segment 619 in system memory 602, the first stream output buffer 622 may be implemented by a fifth memory segment 623 in system memory 602, and the second stream output buffer 624 may be implemented by a sixth memory segment 625 in system memory 602. The scanner 612, server 614, and dispatcher 620 may be implemented by the CPU 604, and the algorithm 626 may be executed by the accelerator 606.

Figure 7:
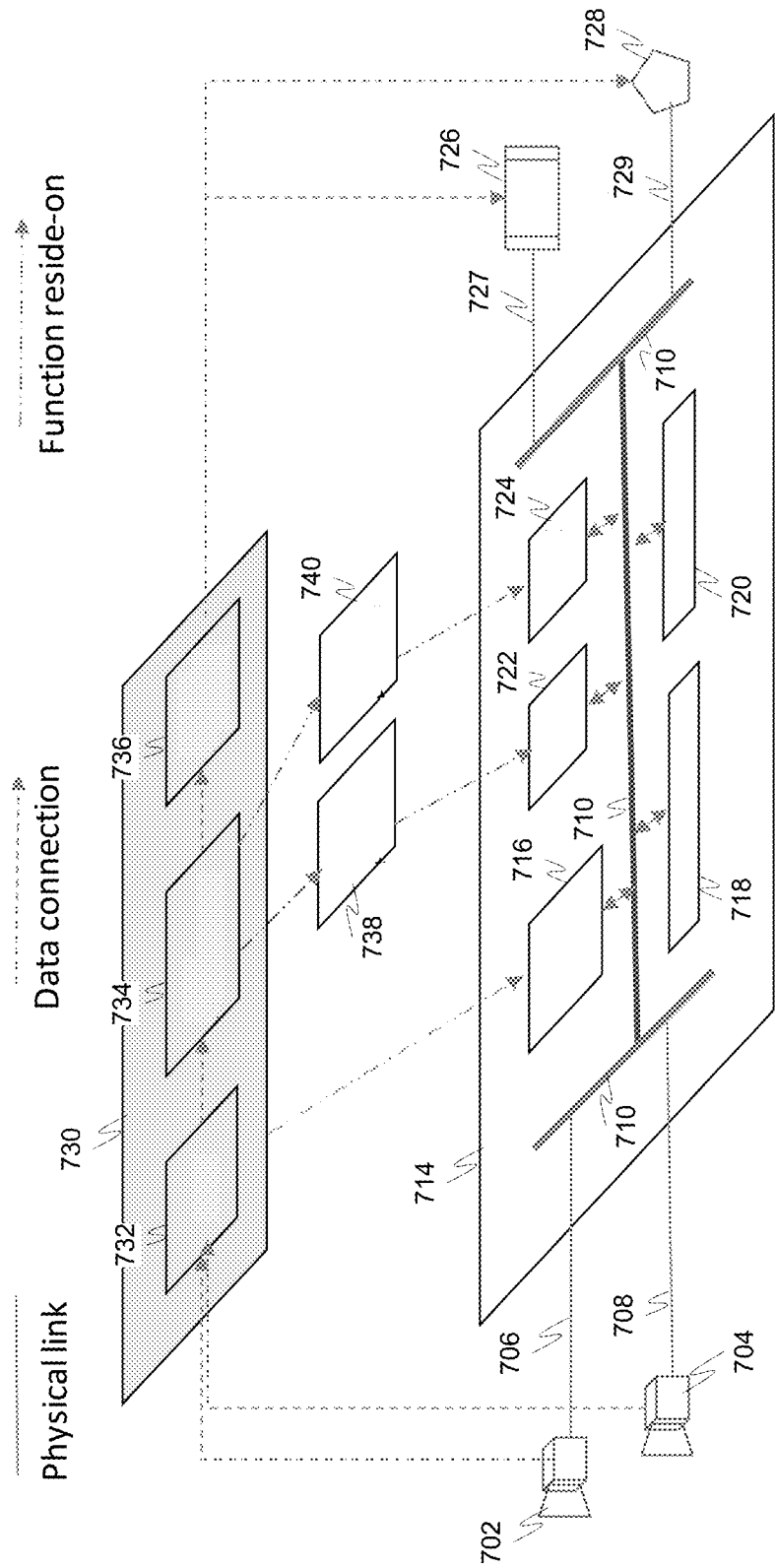
FIG. 7 is a block diagram illustrating another example hardware configuration for a controller for processing perception data from multiple perception data sources, in accordance with various embodiments.

FIG. 7 is a block diagram illustrating another example hardware configuration for a controller 700 for processing perception data from multiple perception data sources. The example hardware used in the controller 700 includes a first perception device 702 (e.g., camera 702), a second perception device 704 (e.g., camera 704), a controller board 714, a first physical link 706 connecting the first perception device 702 to a bus 710 on controller board 714, a second physical link 708 connecting the second perception device 704 to the bus 710 on controller board 714, CPU 716 on controller board 714, memory devices 718, 720 on controller board 714, accelerator devices 722, 724 on controller board 714, a display device 726, and a low-level controller 728 (e.g., brake controller, steering controller, body controller, etc.).

An example controller 730 may be implemented via the hardware on controller board 714. The example controller 730 includes a scanner 732, a CNN (convolutional neural network) server 734, and a dispatcher 736. The scanner 732 and the dispatcher 736 may be implemented via the CPU 716. The CNN server 734 may have two CNN partitions 738, 740. The first CNN partition 738 may be implemented via the accelerator 722 and the second CNN partition 740 may be implemented via the accelerator 724.

The scanner 732 may receive input perception streams from the perception devices 702, 704 via the bus 710. The dispatcher may dispatch processed perception streams to the downstream display device 726 and a downstream low-level controller 728 via connections 727, 729 to the bus 710.

The system may use queues or buffers to exchange data from an upstream system component to a downstream system component. The buffers may be implemented via memory devices 716, 718. The queues or buffers may have read and write controls. The read controls may only allow data to be read from a buffer/queue when the buffer/queue is not empty and prevent reading when the buffer/queue is empty. The write controls may only allow data to be written to the buffer/queue when the buffer/queue is not full and prevent data to be written to the buffer/queue when the buffer/queue is full.

In one embodiment, a controller on a device having multiple co-processors used for processing multiple perception streams is disclosed. The controller is configured to: read data from a plurality of perception streams according to a reading schedule determined by a predetermined policy, wherein each perception stream comprises perception data from a different perception sensor; assign a unique identification tag to each perception stream; write each perception stream with its unique identification tag to a server input queue based on the predetermined policy for processing by a server; retrieve processed perception streams from the server output queue, wherein the processed perception streams were processed by the server and written by the server to the server output queue; and dispatch each retrieved processed perception stream to an appropriate post-processing destination, wherein the appropriate post-processing destination is determined from the tag associated with the retrieved processed perception stream.

These aspects and other embodiments may include one or more of the following features. The frequency at which a first perception stream is read may be different from the frequency at which a second perception stream is read. The perception sensors may comprise one or more of a camera, lidar, or other perception sensor data source. The server input queue may comprise storage media accessible by the controller. The predetermined policy may identify an order for the perception streams in the input server queue. The identified order may comprise the order in which the perception streams are read. The server may be configured to: retrieve tagged perception streams from the server input queue in the order in which the tagged perception streams are written in the server input queue; apply a processing algorithm to process the retrieved tagged perception streams; and output the processed perception streams to the server output queue. The server may comprise a plurality of redundant servers wherein each redundant server is configured to operate in parallel with another redundant server. The server may be implemented by accelerator hardware, wherein the accelerator hardware comprises a digital signal processor (DSP) or a field programmable gate array (FPGA). The server may be implemented as a software component running on accelerator hardware comprising a graphics processing unit (GPU), a central processing unit (CPU) that is dedicated or shared with other software components, or a math co-processor. The processing algorithm may comprise a neural network (NN) algorithm. The server may comprise a plurality of hardware devices and the processing algorithm may be partitioned into a plurality of processing algorithm partitions. The number of processing algorithm partitions may be equal to the number of hardware devices. Each processing algorithm partition may be executed by a different one of the plurality of hardware devices. The controller may further comprise a communication buffer for holding data between execution of an upstream processing algorithm partition and execution of a downstream processing algorithm partition. The downstream processing algorithm partition may be invoked asynchronously to process data stored in the communication buffer when data is available in the communication buffer. Results from the execution of the upstream processing algorithm partition may be stored in the communication buffer and the results may be retrieved from the communication buffer for execution by the downstream processing algorithm partition. To dispatch each retrieved processed perception stream to an appropriate post-processing destination, the controller may be configured to decode each retrieved processed perception stream to separate the results of different streams using the tag information. The controller may be configured to dispatch each retrieved processed perception stream to an appropriate one of the plurality of stream output buffers for downstream processing.

In another embodiment, a method in a multiprocessor system for processing multiple perception streams using a plurality of processing devices is disclosed. The plurality of processing devices includes a central processing unit (CPU) and an accelerator device. The method comprises: reading data from a plurality of perception streams according to a reading schedule determined by a predetermined policy, wherein each perception stream comprises perception data from a different perception sensor; assigning a unique identification tag to each perception stream; writing each perception stream with its unique identification tag to a server input queue based on the predetermined policy; and processing the tagged perception streams using a server. The processing includes: retrieving tagged perception streams from the server input queue in the order in which the tagged perception streams are written in the server input queue; applying a processing algorithm to process the retrieved tagged perception streams; and outputting the processed perception streams to a server output queue. The method further comprises retrieving the processed perception streams from the server output queue; and dispatching each retrieved processed perception stream to an appropriate post-processing destination, wherein the appropriate post-processing destination is determined from the tag associated with the retrieved processed perception stream.

These aspects and other embodiments may include one or more of the following features. The frequency at which a first perception stream is read may be different from the frequency at which a second perception stream is read. The perception sensors may comprise one or more of a camera, lidar, or other perception sensor data source. The server input queue may comprise storage media accessible by the controller. The predetermined policy may identify an order for the perception streams in the input server queue. The identified order may comprise the order in which the perception streams are read. The server may comprise a plurality of redundant servers wherein each redundant server is configured to operate in parallel with another redundant server. The server may be implemented by accelerator hardware, wherein the accelerator hardware comprises a digital signal processor (DSP) or a field programmable gate array (FPGA). The server may be implemented as a software component running on accelerator hardware comprising a graphics processing unit (GPU), a central processing unit (CPU) that is dedicated or shared with other software components, or a math co-processor. The applying a processing algorithm may comprise applying a neural network (NN) algorithm. The server may comprise a plurality of hardware devices and the processing algorithm may be partitioned into a plurality of processing algorithm partitions. The number of processing algorithm partitions may be equal to the number of hardware devices. The method may further comprise executing each processing algorithm partition by a different one of the plurality of hardware devices. The method may further comprise providing a communication buffer for holding data between execution of an upstream processing algorithm partition and execution of a downstream processing algorithm partition. The method may further comprise invoking the downstream processing algorithm partition asynchronously to process data stored in the communication buffer when data is available in the communication buffer. The method may further comprise storing results from the execution of the upstream processing algorithm partition in the communication buffer and retrieving the results from the communication buffer for execution by the downstream processing algorithm partition. The dispatching each retrieved processed perception stream to an appropriate post-processing destination may comprise decoding each retrieved processed perception stream to identify associated tag information and separating the results of different streams using the tag information. The method may further comprise providing a plurality of stream output buffers and dispatching each retrieved processed perception stream to an appropriate one of the plurality of stream output buffers for downstream processing.

In another embodiment, a vehicle for transporting passengers, the vehicle comprising a plurality of perception data sources for performing detection and viewing operations for the vehicle and a perception data processing system for processing perception data from multiple perception data sources is disclosed. The perception data processing system comprises a plurality of processing units comprising one or more central processing units (CPUs) and one or more accelerator modules; memory media having a plurality of memory segments for implementing a server input queue and a server output queue; and a scanner implemented by one or more of the plurality of processing units. The scanner is configured to: read data from a plurality of perception streams according to a reading schedule determined by a predetermined policy, wherein each perception stream comprises perception data from a different perception sensor; assign a unique identification tag to each perception stream; and write each perception stream with its unique identification tag to the server input queue based on the predetermined policy. The perception data processing system further comprises a server implemented by one or more of the plurality of processing units. The server is configured to: retrieve tagged perception streams from the server input queue in the order in which the tagged perception streams are written in the server input queue; apply a processing algorithm to process the retrieved tagged perception streams; and output the processed perception streams to the server output queue. The perception data processing system further comprises a dispatcher implemented by one or more of the plurality of processing units. The dispatcher is configured to: retrieve the processed perception streams from the server output queue; and dispatch each retrieved processed perception stream to an appropriate post-processing destination, wherein the appropriate post-processing destination is determined from the tag associated with the retrieved processed perception stream.

These aspects and other embodiments may include one or more of the following features. The frequency at which a first perception stream is read may be different from the frequency at which a second perception stream is read. The perception sensors may comprise one or more of a camera, lidar, or other perception sensor data source. The predetermined policy may identify an order for the perception streams in the input server queue. The identified order may comprise the order in which the perception streams are read. The server may comprise a plurality of redundant servers wherein each redundant server is configured to operate in parallel with another redundant server. The server may be implemented by accelerator hardware, wherein the accelerator hardware comprises a digital signal processor (DSP) or a field programmable gate array (FPGA). The server may be implemented as a software component running on accelerator hardware comprising a graphics processing unit (GPU), a central processing unit (CPU) that is dedicated or shared with other software components, or a math co-processor. The processing algorithm may comprise a neural network (NN) algorithm. The server may comprise a plurality of hardware devices and the processing algorithm may be partitioned into a plurality of processing algorithm partitions. The number of processing algorithm partitions may be equal to the number of hardware devices. Each processing algorithm partition may be executed by a different one of the plurality of hardware devices. The system may further comprise a communication buffer, implemented by the memory media, for holding data between execution of an upstream processing algorithm partition and execution of a downstream processing algorithm partition. The downstream processing algorithm partition may be invoked asynchronously to process data stored in the communication buffer when data is available in the communication buffer. Results from the execution of the upstream processing algorithm partition may be stored in the communication buffer and the results may be retrieved from the communication buffer for execution by the downstream processing algorithm partition. To dispatch each retrieved processed perception stream to an appropriate post-processing destination, the dispatcher may be configured to decode each retrieved processed perception stream to separate the results of different streams using the tag information. The dispatcher may be configured to dispatch each retrieved processed perception stream to an appropriate one of the plurality of stream output buffers for downstream processing.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A controller on a device having multiple co-processors used for processing multiple perception streams, the controller configured to:
   read data from a plurality of perception streams according to a reading schedule determined by a predetermined policy, each perception stream comprising perception data from a different perception sensor;
   assign a unique identification tag to each perception stream;
   write each perception stream with its unique identification tag to a server input queue based on the predetermined policy for processing by a server, wherein the server is configured to:
      retrieve tagged perception streams from the server input queue;
      apply a processing algorithm that is partitioned into a plurality of processing algorithm partitions to process the retrieved tagged perception streams, wherein a downstream processing algorithm partition may be invoked asynchronously to process data when available in a communication buffer from execution of an upstream processing algorithm partition; and
      output processed perception streams to a server output queue;
   retrieve the processed perception streams from the server output queue; and
   dispatch each retrieved processed perception stream to an appropriate post-processing destination, wherein the appropriate post-processing destination is determined from the tag associated with the retrieved processed perception stream.

2. The controller of claim 1, wherein the predetermined policy identifies an order for the perception streams in the input server queue.

3. The controller of claim 2, wherein the identified order comprises the order in which the perception streams are read.

4. The controller of claim 1, wherein the server is configured to:
   retrieve tagged perception streams from the server input queue in the order in which the tagged perception streams are written in the server input queue.

5. The controller of claim 4, wherein the server comprises a plurality of redundant servers wherein each redundant server is configured to operate in parallel with another redundant server.

6. The controller of claim 4, wherein the server is implemented by accelerator hardware, the accelerator hardware comprising a digital signal processor (DSP) or a field programmable gate array (FPGA).

7. The controller of claim 4, wherein the server is implemented as a software component running on accelerator hardware comprising a graphics processing unit (GPU), a central processing unit (CPU) that is dedicated or shared with other software components, or a math co-processor.

8. The controller of claim 4, wherein the processing algorithm comprises a neural network (NN) algorithm.

9. The controller of claim 4, wherein the server comprises a plurality of hardware devices.

10. The controller of claim 9, further comprising the communication buffer for holding data between execution of the upstream processing algorithm partition and execution of the downstream processing algorithm partition.

11. The controller of claim 9, wherein the server is configured to execute a plurality of processing algorithm partitions by a different one of the plurality of hardware devices.

12. A method in a multiprocessor system for processing multiple perception streams using a plurality of processing devices, the plurality of processing devices including a central processing unit (CPU) and an accelerator device, the method comprising:
   reading data from a plurality of perception streams according to a reading schedule determined by a predetermined policy, each perception stream comprising perception data from a different perception sensor;
   assigning a unique identification tag to each perception stream;
   writing each perception stream with its unique identification tag to a server input queue based on the predetermined policy;
   processing the tagged perception streams using a server comprising a plurality of hardware devices, the processing including:
      retrieving tagged perception streams from the server input queue in the order in which the tagged perception streams are written in the server input queue;
      applying a processing algorithm that is partitioned into a plurality of processing algorithm partitions to process the retrieved tagged perception streams, including executing a plurality of processing algorithm partitions by a different one of the plurality of hardware devices; and
      outputting the processed perception streams to a server output queue;
   retrieving the processed perception streams from the server output queue; and
   dispatching each retrieved processed perception stream to an appropriate post-processing destination, wherein the appropriate post-processing destination is determined from the tag associated with the retrieved processed perception stream.

13. The method of claim 12, wherein the frequency at which a first perception stream is read is different from the frequency at which a second perception stream is read.

14. The method of claim 12, wherein applying a processing algorithm comprises applying a neural network (NN) algorithm.

15. The method of claim 12, further comprising providing a communication buffer for holding data between execution of an upstream processing algorithm partition and execution of a downstream processing algorithm partition.

16. The method of claim 15, further comprising invoking the downstream processing algorithm partition asynchronously to process data stored in the communication buffer when data is available in the communication buffer.

17. The method of claim 15, further comprising storing results from the execution of the upstream processing algorithm partition in the communication buffer and retrieving the results from the communication buffer for execution by the downstream processing algorithm partition.

18. A vehicle for transporting passengers, the vehicle comprising a plurality of perception data sources for performing detection and viewing operations for the vehicle and a perception data processing system for processing perception data from multiple perception data sources, the perception data processing system comprising:
- a plurality of processing units comprising one or more central processing units (CPUs) and one or more accelerator modules;
- memory media having a plurality of memory segments for implementing a server input queue and a server output queue;
- a scanner implemented by one or more of the plurality of processing units, the scanner configured to:
  - read data from a plurality of perception streams according to a reading schedule determined by a predetermined policy, each perception stream comprising perception data from a different perception sensor;
  - assign a unique identification tag to each perception stream; and
  - write each perception stream with its unique identification tag to the server input queue based on the predetermined policy;
- a server implemented by one or more of the plurality of processing units, the server configured to:
  - retrieve tagged perception streams from the server input queue in the order in which the tagged perception streams are written in the server input queue;
  - apply a processing algorithm that is partitioned into a plurality of processing algorithm partitions to process the retrieved tagged perception streams, wherein a downstream processing algorithm partition may be invoked asynchronously to process data when available in a communication buffer from execution of an upstream processing algorithm partition; and
  - output the processed perception streams to the server output queue; and
- a dispatcher implemented by one or more of the plurality of processing units, the dispatcher configured to:
  - retrieve the processed perception streams from the server output queue; and
  - dispatch each retrieved processed perception stream to an appropriate post-processing destination, wherein the appropriate post-processing destination is determined from the tag associated with the retrieved processed perception stream.

19. The vehicle of claim 18, wherein the server is configured to execute a plurality of processing algorithm partitions by a different one of the plurality of processing units.

20. The vehicle of claim 18, wherein the processing algorithm comprises a neural network (NN) algorithm.

* * * * *